United States Patent
Dubeyko et al.

(10) Patent No.: US 11,169,918 B2
(45) Date of Patent: **\*Nov. 9, 2021**

(54) DATA ACCESS IN DATA STORAGE DEVICE INCLUDING STORAGE CLASS MEMORY

(71) Applicant: Western Digital Technologies, Inc., San Jose, CA (US)

(72) Inventors: Viacheslav Dubeyko, San Jose, CA (US); Chao Sun, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,719

(22) Filed: Jul. 6, 2020

(65) Prior Publication Data
US 2020/0334147 A1    Oct. 22, 2020

Related U.S. Application Data

(63) Continuation of application No. 16/196,077, filed on Nov. 20, 2018, now Pat. No. 10,740,231.

(51) Int. Cl.
*G06F 12/08* (2016.01)
*G06F 3/06* (2006.01)
(Continued)

(52) U.S. Cl.
CPC ........ *G06F 12/0802* (2013.01); *G06F 3/0616* (2013.01); *G06F 3/0625* (2013.01);
(Continued)

(58) Field of Classification Search
CPC .. G06F 12/0802; G06F 3/0616; G06F 3/0653; G06F 3/0625; G06F 3/0659;
(Continued)

(56) References Cited

U.S. PATENT DOCUMENTS 4,420,807 A ‡ 12/1983 Nolta ................. G11B 20/1883
                                                                        365/20
5,608,876 A ‡ 3/1997 Cohen ................. G06F 12/0684
                                                                        710/30
(Continued)

FOREIGN PATENT DOCUMENTS

WO      2012134641 A2   10/2012
WO   WO-2012134641 A2 ‡ 10/2012 ......... G06F 12/1081

OTHER PUBLICATIONS

Wu et al.; "Delta-FTL: Improving SSD Lifetime via Exploiting Content Locality"; Apr. 10-13, 2012; 13 pages; available at: https://cis.temple.edu/~he/publications/Conferences/DeltaFTL-Eurosys12.pdf.‡

(Continued)

*Primary Examiner* — Masud K Khan
(74) *Attorney, Agent, or Firm* — Barry IP Law, P.C.

(57) ABSTRACT

A device includes a Storage Class Memory (SCM) and a secondary memory with at least one of a greater read or write latency than the SCM. At least a portion of the SCM is provided as an address space of a processor. An SCM smallest writable unit for writing data in the SCM is smaller than a secondary memory smallest writable unit for writing data in the secondary memory. An operation instruction is received from the processor to perform an operation on data stored in the secondary memory. The data is loaded from the secondary memory into the SCM for performance of the operation.

20 Claims, 7 Drawing Sheets

(51) Int. Cl.
*G06F 12/10* (2016.01)
*G06F 12/0802* (2016.01)

(52) U.S. Cl.
CPC .......... *G06F 3/0653* (2013.01); *G06F 3/0659* (2013.01); *G06F 12/10* (2013.01); *G06F 2212/1024* (2013.01)

(58) Field of Classification Search
CPC ............. G06F 12/10; G06F 2212/1024; G06F 2212/7203; G06F 12/0246; G06F 3/061; G06F 3/0679; G06F 3/064; Y02D 10/00
See application file for complete search history.

(56) References Cited

U.S. PATENT DOCUMENTS

| | | | |
|---|---|---|---|
| 6,772,296 B1 | 8/2004 | Mathiske | |
| 6,856,556 B1 ‡ | 2/2005 | Hajeck | G06K 19/0701 365/18 |
| 7,023,726 B1 ‡ | 4/2006 | Chen | G11C 11/15 365/15 |
| 7,126,857 B2 ‡ | 10/2006 | Hajeck | G06K 19/0701 365/18 |
| 7,216,211 B2 ‡ | 5/2007 | Munguia | G06F 12/0223 711/10 |
| 7,386,655 B2 ‡ | 6/2008 | Gorobets | G06F 12/0246 711/10 |
| 7,430,136 B2 ‡ | 9/2008 | Merry, Jr. | G06F 12/1433 365/18 |
| 7,447,807 B1 ‡ | 11/2008 | Merry | G06F 3/0604 710/8 |
| 7,502,256 B2 ‡ | 3/2009 | Merry, Jr. | G06F 12/1433 365/18 |
| 7,509,441 B1 ‡ | 3/2009 | Merry | G06F 3/0604 710/36 |
| 7,596,643 B2 ‡ | 9/2009 | Merry, Jr. | G06F 3/061 710/56 |
| 7,653,778 B2 ‡ | 1/2010 | Merry, Jr. | G11C 16/349 711/10 |
| 7,685,337 B2 ‡ | 3/2010 | Merry, Jr. | G06F 13/385 710/62 |
| 7,685,338 B2 ‡ | 3/2010 | Merry, Jr. | G06F 13/385 710/62 |
| 7,685,374 B2 ‡ | 3/2010 | Diggs | G06F 3/0659 711/15 |
| 7,733,712 B1 ‡ | 6/2010 | Walston | G11C 5/143 365/18 |
| 7,765,373 B1 ‡ | 7/2010 | Merry | G06F 3/0679 711/16 |
| 7,898,855 B2 ‡ | 3/2011 | Merry, Jr. | G11C 16/22 365/18 |
| 7,904,619 B2 ‡ | 3/2011 | Danilak | G06F 3/0616 710/56 |
| 7,912,991 B1 ‡ | 3/2011 | Merry | G06F 3/0604 710/8 |
| 7,936,603 B2 ‡ | 5/2011 | Merry, Jr. | G06F 21/79 365/18 |
| 7,962,792 B2 ‡ | 6/2011 | Diggs | G06F 3/0616 714/27 |
| 7,979,601 B2 ‡ | 7/2011 | Berenbaum | G06F 13/28 710/22 |
| 8,078,918 B2 ‡ | 12/2011 | Diggs | G06F 11/008 714/42 |
| 8,090,899 B1 ‡ | 1/2012 | Syu | G06F 12/0246 711/10 |
| 8,095,851 B2 ‡ | 1/2012 | Diggs | G06F 11/1068 714/76 |
| 8,108,692 B1 ‡ | 1/2012 | Merry | G06F 21/79 713/19 |
| 8,122,185 B2 ‡ | 2/2012 | Merry, Jr. | G11C 16/3495 711/10 |
| 8,127,048 B1 ‡ | 2/2012 | Merry | G06F 3/0664 710/8 |
| 8,135,903 B1 ‡ | 3/2012 | Kan | G06F 12/0246 711/10 |
| 8,151,020 B2 ‡ | 4/2012 | Merry, Jr. | G06F 3/061 710/56 |
| 8,161,227 B1 ‡ | 4/2012 | Diggs | G06F 3/0658 711/10 |
| 8,166,245 B2 ‡ | 4/2012 | Diggs | G06F 3/0607 711/11 |
| 8,243,525 B1 ‡ | 8/2012 | Kan | G11C 16/3495 365/18 |
| 8,254,172 B1 ‡ | 8/2012 | Kan | G11C 16/06 365/18 |
| 8,261,012 B2 ‡ | 9/2012 | Kan | G11C 16/22 711/10 |
| 8,296,625 B2 ‡ | 10/2012 | Diggs | G06F 11/1068 714/76 |
| 8,312,207 B2 ‡ | 11/2012 | Merry, Jr. | G11C 16/3495 711/10 |
| 8,316,176 B1 ‡ | 11/2012 | Phan | G06F 12/0246 711/10 |
| 8,341,339 B1 ‡ | 12/2012 | Boyle | G06F 3/0652 711/10 |
| 8,375,151 B1 ‡ | 2/2013 | Kan | G06F 3/0659 710/28 |
| 8,392,635 B2 ‡ | 3/2013 | Booth | G06F 13/24 710/48 |
| 8,397,107 B1 ‡ | 3/2013 | Syu | G06F 11/1012 714/52 |
| 8,407,449 B1 ‡ | 3/2013 | Colon | G06F 12/0246 711/20 |
| 8,423,722 B1 ‡ | 4/2013 | Deforest | G06F 3/0613 711/14 |
| 8,433,858 B1 ‡ | 4/2013 | Diggs | G06F 3/0661 711/15 |
| 8,443,167 B1 ‡ | 5/2013 | Fallone | G06F 12/0246 711/20 |
| 8,447,920 B1 ‡ | 5/2013 | Syu | G06F 12/0607 711/10 |
| 8,458,435 B1 ‡ | 6/2013 | Rainey, III | G06F 12/0246 711/20 |
| 8,478,930 B1 ‡ | 7/2013 | Syu | G06F 12/0246 711/10 |
| 8,489,854 B1 ‡ | 7/2013 | Colon | G06F 12/0246 711/20 |
| 8,503,237 B1 ‡ | 8/2013 | Horn | G11C 29/028 365/18 |
| 8,521,972 B1 ‡ | 8/2013 | Boyle | G06F 12/0246 711/15 |
| 8,549,236 B2 ‡ | 10/2013 | Diggs | G06F 11/1456 711/15 |
| 8,583,835 B1 ‡ | 11/2013 | Kan | G06F 3/0661 710/5 |
| 8,601,311 B2 ‡ | 12/2013 | Horn | G06F 11/108 714/6 |
| 8,601,313 B1 ‡ | 12/2013 | Horn | G06F 11/108 714/6 |
| 8,612,669 B1 ‡ | 12/2013 | Syu | G06F 3/0604 711/10 |
| 8,612,804 B1 ‡ | 12/2013 | Kang | G11C 16/349 714/42 |
| 8,615,681 B2 ‡ | 12/2013 | Horn | G06F 11/108 714/24 |
| 8,631,191 B2 ‡ | 1/2014 | Hashimoto | G06F 11/1458 711/10 |
| 8,638,602 B1 ‡ | 1/2014 | Horn | G11C 5/147 365/18 |
| 8,639,872 B1 ‡ | 1/2014 | Boyle | G06F 3/0656 711/10 |
| 8,683,113 B2 ‡ | 3/2014 | Abasto | G06F 12/0246 711/10 |
| 8,700,834 B2 ‡ | 4/2014 | Horn | G06F 3/068 710/10 |
| 8,700,950 B1 ‡ | 4/2014 | Syu | G06F 11/1016 714/6 |
| 8,700,951 B1 ‡ | 4/2014 | Call | G06F 11/0727 714/6 |

(56) References Cited

U.S. PATENT DOCUMENTS

| | | | |
|---|---|---|---|
| 8,706,985 B1 ‡ | 4/2014 | Boyle | G06F 12/0246 |
| | | | 711/15 |
| 8,707,104 B1 ‡ | 4/2014 | Jean | G06F 11/2215 |
| | | | 714/41 |
| 8,713,066 B1 ‡ | 4/2014 | Lo | G06F 12/0246 |
| | | | 707/80 |
| 8,713,357 B1 ‡ | 4/2014 | Jean | G06F 11/0769 |
| | | | 714/6 |
| 8,719,531 B2 ‡ | 5/2014 | Strange | G06F 11/008 |
| | | | 711/16 |
| 8,724,392 B1 ‡ | 5/2014 | Asnaashari | G06F 3/0679 |
| | | | 365/18 |
| 8,724,422 B1 ‡ | 5/2014 | Agness | G11C 5/147 |
| | | | 365/22 |
| 8,725,931 B1 ‡ | 5/2014 | Kang | G06F 13/1642 |
| | | | 711/10 |
| 8,745,277 B2 ‡ | 6/2014 | Kan | G06F 3/0659 |
| | | | 710/5 |
| 8,751,728 B1 ‡ | 6/2014 | Syu | G06F 3/0659 |
| | | | 711/10 |
| 8,769,190 B1 ‡ | 7/2014 | Syu | G06F 3/064 |
| | | | 711/10 |
| 8,769,232 B2 ‡ | 7/2014 | Suryabudi | G06F 3/061 |
| | | | 711/16 |
| 8,775,720 B1 ‡ | 7/2014 | Meyer | G11B 20/10 |
| | | | 711/10 |
| 8,782,327 B1 ‡ | 7/2014 | Kang | G06F 12/0246 |
| | | | 711/10 |
| 8,788,778 B1 ‡ | 7/2014 | Boyle | G06F 3/0674 |
| | | | 711/16 |
| 8,788,779 B1 ‡ | 7/2014 | Horn | G06F 3/0655 |
| | | | 711/16 |
| 8,788,880 B1 ‡ | 7/2014 | Gosla | G11C 29/4401 |
| | | | 714/16 |
| 8,793,429 B1 ‡ | 7/2014 | Call | G06F 12/0246 |
| | | | 711/10 |
| 8,903,995 B1 ‡ | 12/2014 | Basak | H04L 43/08 |
| | | | 709/22 |
| 8,947,803 B1 ‡ | 2/2015 | Yamakawa | G11B 27/36 |
| | | | 360/31 |
| 9,015,123 B1 | 4/2015 | Mathew et al. | |
| 9,116,800 B2 ‡ | 8/2015 | Post | G06F 12/0292 |
| 9,189,387 B1 ‡ | 11/2015 | Taylor | G06F 3/06 |
| 9,342,453 B2 * | 5/2016 | Nale | G06F 12/0238 |
| 9,619,174 B2 ‡ | 4/2017 | Chen | G06F 3/0611 |
| 9,836,404 B2 * | 12/2017 | Ummadi | G06F 12/0875 |
| 9,857,995 B1 ‡ | 1/2018 | Malina | G06F 3/068 |
| 10,126,981 B1 ‡ | 11/2018 | Malina | G06F 3/0685 |
| 10,423,536 B2 * | 9/2019 | Noguchi | G06F 12/0868 |
| 10,482,009 B1 | 11/2019 | Sabol et al. | |
| 10,496,544 B2 * | 12/2019 | Wang | G06F 12/0891 |
| 2008/0148048 A1 | 6/2008 | Govil et al. | |
| 2010/0037002 A1 ‡ | 2/2010 | Bennett | G06F 3/0647 |
| | | | 711/10 |
| 2010/0174849 A1 ‡ | 7/2010 | Walston | G06F 12/0246 |
| | | | 711/10 |
| 2010/0250793 A1 ‡ | 9/2010 | Syu | G11C 16/32 |
| | | | 710/29 |
| 2011/0099323 A1 ‡ | 4/2011 | Syu | G06F 12/0246 |
| | | | 711/10 |
| 2011/0283049 A1 ‡ | 11/2011 | Kang | G11C 16/16 |
| | | | 711/10 |
| 2012/0166891 A1 ‡ | 6/2012 | Dahlen | G06F 12/0638 |
| | | | 714/54 |
| 2012/0210068 A1 ‡ | 8/2012 | Joshi | G06F 9/45558 |
| | | | 711/12 |
| 2012/0260020 A1 ‡ | 10/2012 | Suryabudi | G06F 3/0659 |
| | | | 711/10 |
| 2012/0027853 A1 ‡ | 11/2012 | Horn | G06F 11/108 |
| | | | 711/10 |
| 2012/0278531 A1 | 11/2012 | Horn | |
| 2012/0284460 A1 ‡ | 11/2012 | Guda | G06F 3/061 |
| | | | 711/11 |
| 2012/0317377 A1 | 12/2012 | Palay et al. | |
| 2012/0324191 A1 ‡ | 12/2012 | Strange | G06F 11/008 |
| | | | 711/16 |
| 2012/0331016 A1 ‡ | 12/2012 | Janson | G06F 16/25 |
| | | | 707/80 |
| 2013/0024605 A1 | 1/2013 | Sharon et al. | |
| 2013/0080687 A1 ‡ | 3/2013 | Nemazie | G06F 12/0246 |
| | | | 711/10 |
| 2013/0091321 A1 ‡ | 4/2013 | Nishtala | G06F 12/08 |
| | | | 711/10 |
| 2013/0132638 A1 ‡ | 5/2013 | Horn | G06F 12/0871 |
| | | | 711/10 |
| 2013/0145106 A1 ‡ | 6/2013 | Kan | G06F 3/0659 |
| | | | 711/14 |
| 2013/0290793 A1 ‡ | 10/2013 | Booth | G11C 29/82 |
| | | | 714/54 |
| 2014/0006686 A1 | 1/2014 | Chen et al. | |
| 2014/0059405 A1 ‡ | 2/2014 | Syu | G06F 11/1072 |
| | | | 714/77 |
| 2014/0101369 A1 ‡ | 4/2014 | Tomlin | G06F 12/0246 |
| | | | 711/10 |
| 2014/0108703 A1 | 4/2014 | Cohen et al. | |
| 2014/0115427 A1 ‡ | 4/2014 | Lu | H03M 13/618 |
| | | | 714/77 |
| 2014/0133220 A1 ‡ | 5/2014 | Danilak | G11C 11/5628 |
| | | | 365/15 |
| 2014/0136753 A1 ‡ | 5/2014 | Tomlin | G06F 12/0246 |
| | | | 711/10 |
| 2014/0149826 A1 ‡ | 5/2014 | Lu | G06F 11/108 |
| | | | 714/76 |
| 2014/0157078 A1 ‡ | 6/2014 | Danilak | H03M 13/09 |
| | | | 714/75 |
| 2014/0181432 A1 ‡ | 6/2014 | Horn | G06F 12/0871 |
| | | | 711/15 |
| 2014/0223255 A1 ‡ | 8/2014 | Lu | H03M 13/114 |
| | | | 714/75 |
| 2014/0226389 A1 | 8/2014 | Ebsen et al. | |
| 2014/0351515 A1 ‡ | 11/2014 | Chiu | G06F 3/0685 |
| | | | 711/11 |
| 2015/0058534 A1 ‡ | 2/2015 | Lin | G06F 3/0679 |
| | | | 711/10 |
| 2015/0142996 A1 ‡ | 5/2015 | Lu | G06F 12/0246 |
| | | | 710/26 |
| 2015/0302903 A1 ‡ | 10/2015 | Chaurasia | G11C 7/1072 |
| | | | 711/10 |
| 2015/0363320 A1 ‡ | 12/2015 | Kumar | G06F 21/575 |
| | | | 711/10 |
| 2016/0027481 A1 ‡ | 1/2016 | Hong | G11C 16/32 |
| | | | 714/80 |
| 2016/0118130 A1 ‡ | 4/2016 | Chadha | G11C 16/225 |
| | | | 711/10 |
| 2016/0313943 A1 ‡ | 10/2016 | Hashimoto | G06F 3/0659 |
| 2016/0342357 A1 ‡ | 11/2016 | Ramamoorthy | G06F 12/0868 |
| 2016/0357463 A1 ‡ | 12/2016 | DeNeui | G06F 12/0888 |
| 2016/0378337 A1 | 12/2016 | Horspool et al. | |
| 2017/0024332 A1 ‡ | 1/2017 | Rui | G06F 12/1425 |
| 2017/0147499 A1 ‡ | 5/2017 | Mohan | G06F 12/10 |
| 2017/0160987 A1 ‡ | 6/2017 | Royer, Jr. | G06F 3/0625 |
| 2017/0228170 A1 | 8/2017 | Chen et al. | |
| 2017/0286291 A1 | 10/2017 | Thomas | |
| 2018/0004438 A1 | 1/2018 | Hady | |
| 2018/0032432 A1 | 2/2018 | Kowles | |
| 2018/0095898 A1 * | 4/2018 | Khosravi | G06F 12/1408 |
| 2018/0150404 A1 | 5/2018 | Kim et al. | |
| 2018/0307602 A1 | 10/2018 | Xu et al. | |
| 2018/0307620 A1 | 10/2018 | Zhou | |
| 2018/0349041 A1 | 12/2018 | Zhou et al. | |
| 2019/0163375 A1 | 5/2019 | Amidi et al. | |
| 2019/0188153 A1 ‡ | 6/2019 | Benisty | G06F 12/0246 |
| 2019/0310796 A1 | 10/2019 | Perez et al. | |
| 2019/0339904 A1 | 11/2019 | Myran et al. | |

(56) References Cited

U.S. PATENT DOCUMENTS

2019/0347204 A1 11/2019 Du et al.
2020/0004628 A1 1/2020 Ben-Rubi et al.

OTHER PUBLICATIONS

Pending U.S. Appl. No. 16/683,095, filed Nov. 13, 2019, entitled "Storage Class Memory Access", Manzanares et al.‡

Xia et al.; "Edelta: A Word-Enlarging Based Fast Delta Compression Approach"; Jul. 2015; 5 pages; available at: https://www.usenix.org/system/files/conference/hotstorage15/hotstorage15-xia.pdf.‡

Hitachi Vantara; "Hitachi Accelerated Flash 2.0"; Sep. 2018; 20 pages; available at: https://www.hitachivantara.com/en-us/pdfd/white-paper/accelerated-flash-whitepaper.pdf.‡

Pending U.S. Appl. No. 16/246,425, filed Jan. 11, 2019, entitled "Container Key Value Store for Data Storage Devices", Sanjay Subbarao.‡

Pending U.S. Appl. No. 16/246,401, filed Jan. 11, 2019, entitled "Fine Granularity Translation Layer for Data Storage Devices", Sanjay Subbarao.‡

Pending U.S. Appl. No. 16/176,997, filed Oct. 31, 2018, entitled "Tiered Storage Using Storage Class Memory", James N. Malina.‡

Pending U.S. Appl. No. 16/867,793, filed May 6, 2020, entitled "Page Modification Encoding and Caching", Cassuto et al.‡

Phil Mills, "Storage Class Memory—the Future of Solid State Storage,"http://www.snia.org/sites/default/education/tutorials/2009/fall/solid/PhilMills_The_Future_of_Solid_State_Storage.pdf., SNIA Education, 2009.‡

International Search Report and Written Opinion dated Nov. 6, 2020 from International Application No. PCT/US2020/037713, 8 pages.

Kang et al.; "Subpage-based Flash Translation Layer For Solid State Drivers"; Jan. 2006; 10 pages; available at https://cs.kaist.ac.kr/fileDownload?kind=tech&sn=340.

Kim et al.; "Partial Page Buffering for Consumer Devices with Flash Storage"; Proceedings 2013 IEEE 3rd International Conference on Consumer Electronics—Berlin, ICCE—Berlin 2013 (p. 177-180); available at: https://hanyang.elsevierpure.com/en/publications/partial-page-buffering-for-consumer-devices-with-flash-storage.

\* cited by examiner
‡ imported from a related application

DATA ACCESS IN DATA STORAGE DEVICE INCLUDING STORAGE CLASS MEMORY

CROSS-REFERENCE TO RELATED APPLICATION

This application is a continuation of application Ser. No. 16/196,077, filed on Nov. 20, 2018, titled "DATA ACCESS IN DATA STORAGE DEVICE INCLUDING STORAGE CLASS MEMORY", the contents of which are hereby incorporated by reference in their entirety.

BACKGROUND

File systems typically provide access to data using a page cache stored in a main memory of a host, such as in a Dynamic Random Access Memory (DRAM). The page cache can provide a sequence of memory pages used for caching some part of the file system's object content. In more detail, the page cache can be used for caching user data as well as for metadata in a kernel space of an operating system executed by a host. This typically provides quicker access to the cached data for reading and writing than accessing the data from a Data Storage Device (DSD), such as a Hard Disk Drive (HDD) or Solid-State Drive (SSD).

Although the use of a page cache for accessing data may work well for conventional storage memory such as a rotating magnetic disk in an HDD or a NAND flash memory in an SSD, the use of a page cache for accessing data can be inefficient for DSDs that include more recently developed Storage Class Memories (SCMs) due to the quicker access times of such SCMs and the operations required for the page cache. Emerging SCMs can include, for example, Phase Change Memory (PCM), Magnetoresistive Random Access Memory (MRAM), or Resistive RAM (RRAM) that can perform read and write operations much faster than conventional memories such as a rotating magnetic disk or a NAND flash memory, and in some cases, even faster than a main memory such as DRAM.

For example, a DRAM main memory may have a read latency of 50 nanoseconds for reading data and a write latency of 50 nanoseconds for writing data. Given that a read latency for a NAND flash secondary memory may be 25 microseconds and a write latency for the NAND flash secondary memory may be 500 microseconds, the use of a page cache in a DRAM main memory in such an example can provide a quicker access of the cached data. The cost of maintaining and operating a page cache in DRAM, such as loading and flushing pages of data between the DRAM main memory and a conventional secondary memory, such as a NAND flash memory, is outweighed by the quicker access time of the DRAM main memory as compared to the secondary memory.

As noted above, emerging SCMs have data access times significantly faster than conventional memories. For example, an MRAM SCM may have a read latency of 30 nanoseconds and a write latency of 30 nanoseconds. Other emerging SCMs such as RRAM may provide for even faster access times with a read latency of only 3 nanoseconds and a write latency of only 10 nanoseconds.

Despite these quicker access times for SCMs, accessing data from a DSD with a SCM can still take microseconds due to processing by the DSD and/or the host relating to the fixed block or page size currently used to access data. This fixed block or page size may be based on, for example, a smallest writable unit of a secondary memory of the DSD, such as a 512 byte sector size or a 4 KB page size. Accordingly, there is a need for a more efficient way to access data from DSDs that include SCMs to make better use of the faster access times of SCMs. Such DSDs can include, for example, hybrid SSDs that have both an SCM and a conventional memory such as a NAND flash memory.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview Examples

Figure 1:
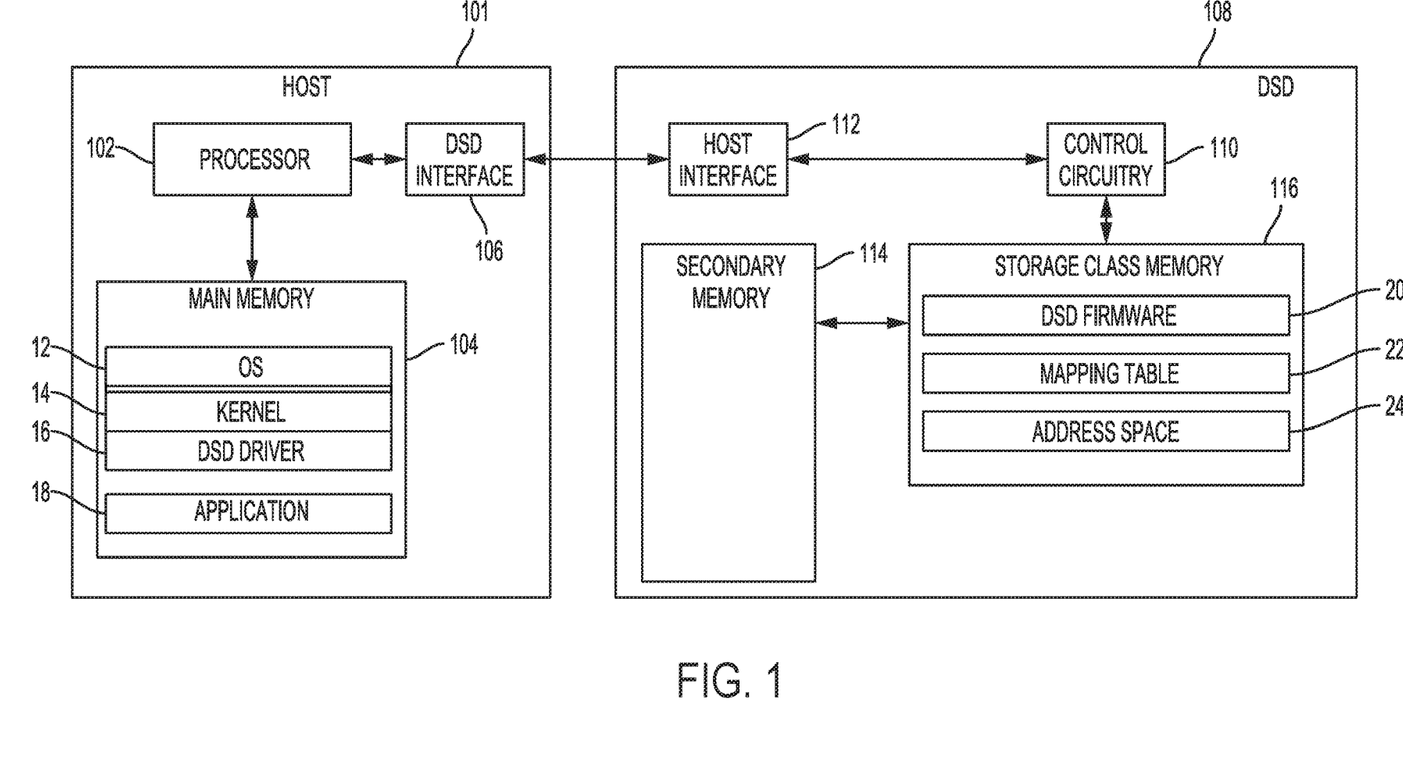
FIG. 1 is a block diagram of a host and a Data Storage Device (DSD) according to an embodiment.

FIG. 1 is a block diagram of host 101 and Data Storage Device (DSD) 108 according to an embodiment. As shown in FIG. 1, host 101 includes processor 102, main memory 104, and DSD interface 106. Processor 102 can execute instructions, such as instructions from Operating System (OS) 12 or application 18. Processor 102 can include circuitry such as a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 102 can include a System on a Chip (SoC), which may be combined with one or both of main memory 104 and DSD interface 106.

Main memory 104 can be used by host 101 to store data used by processor 102. Data stored in main memory 104 can include data instructions loaded from DSD 108 for execution by processor 102, and/or data used in executing instructions from applications, such as OS 12 or application 18. In some implementations, main memory 140 can be a volatile memory, such as a Dynamic Random Access Memory (DRAM).

In the example of FIG. 1, main memory 104 is configured to store OS 12 and application 18. OS 12 creates a byte-addressable, virtual address space for application 18 and other processes executed by processor 102 that maps to locations in main memory 104 for receiving data from files stored in DSD 108. Main memory 104 may be used by OS 12 when executing a process or a thread, such as a subset of instructions in a process.

OS 12 includes kernel 14 and DSD driver 16, and occupies a physical address space in main memory 104. Kernel 14 is a binary image that contains a set of pre-compiled drivers and is loaded into main memory 104 from DSD 108 when OS 12 is loaded. Kernel 14 includes instructions for OS 12 for managing resources of host 101 (e.g., memory allocation) and handling read and write requests from applications, such as application 18, for execution by processor 102. DSD driver 16 provides a software interface to DSD 108 and can include instructions for communicating with DSD 108 in accordance with the processes discussed below. Application 18 can include an application executed by processor 102 that reads and/or writes data in DSD 108.

DSD interface 106 is configured to interface host 101 with DSD 108, and may communicate with DSD 108 using a standard such as, for example, Serial Advanced Technology Attachment (SATA), PCI express (PCIe), Small Computer System Interface (SCSI), Serial Attached SCSI (SAS), Ethernet, Fibre Channel, or WiFi. In this regard, host 101 and DSD 108 may not be physically co-located and may communicate over a network such as a Local Area Network (LAN) or a Wide Area Network (WAN), such as the internet. In addition, DSD interface 106 may also interface with DSD 108 using a logical interface specification such as Non-Volatile Memory express (NVMe) or Advanced Host Controller Interface (AHCI) that may be implemented by DSD driver 16. As will be appreciated by those of ordinary skill in the art, DSD interface 106 can be included as part of processor 102.

As shown in FIG. 1, DSD 108 includes host interface 112, control circuitry 110, secondary memory 114, and Storage Class Memory (SCM) 116. Host interface 112 is configured to interface with host 101 and may communicate with host 101 using a standard such as, for example, SATA, PCIe, SCSI, SAS, Ethernet, Fibre Channel, or WiFi. Control circuitry 110 can include circuitry for executing instructions, such as instructions from DSD firmware 20. In this regard, control circuitry 110 can include circuitry such as one or more processors for executing instructions and can include a microcontroller, a DSP, an ASIC, an FPGA, hard-wired logic, analog circuitry and/or a combination thereof. In some implementations, control circuitry 110 can include an SoC, which may be combined with host interface 112, for example.

Secondary memory 114 can include, for example, a rotating magnetic disk or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

SCM 116 can include, for example, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferro-electric Memory (FeRAM), Magnetoresistive RAM (MRAM), or 3D-XPoint memory. SCM 116 has at least one of a faster read time and a faster write time for accessing data than secondary memory 114. DSD 108 can be considered a hybrid DSD in that it includes at least two different types of memory with secondary memory 114 and SCM 116.

In addition, SCM 116 is capable of storing data at a byte-addressable level, as opposed to other types of NVM that have a smallest writable data size such as a page size of 4 KB or a sector size of 512 Bytes. As discussed in more detail below, this can allow SCM 116 or a portion thereof (e.g., address space 24) to be used as an extension or replacement of main memory 104. In cases where main memory 104 is a DRAM, the reduction in the size of main memory 104 can decrease the amount of power consumed by host 101 and the power consumption of the overall system including host 101 and DSD 108.

As shown in the example of FIG. 1, SCM 116 can store DSD firmware 20, mapping table 22, and address space 24. As discussed in more detail below, control circuitry 110 can associate portions of data stored in secondary memory 114 with unique identifiers for the portions of data that are calculated using the portions of data. The unique identifiers may be stored in SCM 116 and used by OS 12 to access data from files. For example, mapping table 22 can provide a mapping of the unique identifiers with indications of physical locations (e.g., Physical Block Addresses (PBAs)) where the corresponding portions of data are stored in secondary memory 114.

SCM 116 also includes address space 24 which can serve as at least a portion of the address space used by processor 102 of host 101. Address space 24 can store data at a byte-addressable level that can be accessed by processor 102. DSD 108 may provide host 101 with an indication of address space 24. Host 101 may then associate an address range for address space 24 with DSD 108 and an indication that this address range is to be used as a byte-addressable address space, such as for a page cache, for example. When accessing data in address space 24, OS 12 may provide a special command to DSD 108 that includes an address for the address range and a request, such as a load or store request. Control circuitry 110 of DSD 108 would then recognize the special command as being for address space 24 in SCM 116.

In cases where PCIe is used for communication between host 101 and DSD 108, the byte-addressable access of SCM 116 can also eliminate the need for a page cache at host 101. Such implementations can reduce the overhead and delay associated with caching data in main memory 104, which may also have a greater read and/or write latency than SCM 116. In cases where SATA or SAS are used to access data from DSD 108, a page cache will still be used by OS 12 at host 101. However, the faster access of SCM 116 as compared to secondary memory 114 ordinarily allows for faster access of data at DSD 108. SCM 116 can then be used to store data such as file system metadata or cached user data that would otherwise be stored in the main memory of the host. This can allow for a smaller amount of main memory to be used at the host, which can reduce power consumption in cases where the main memory is a DRAM.

In addition, the byte-addressable nature of SCM 116 can allow for a delta-encoding technique when data stored in byte-addressable memory is changed. In such implementations, if host 101 and DSD 108 have a piece of data stored in byte-addressable memory (i.e., in main memory 104 and in address space 24 of SCM 116), then main memory 104 and SCM 114 can exchange only the changed portions for the piece of data or the differences between two states of the piece of data, rather than sending a whole sector's worth of data, for example. This difference or binary patch (e.g., an XOR difference) will be much smaller than the whole sector's worth of data, which can reduce the amount of data traffic and processing of data between host 101 and DSD 108.

In yet other implementations, host 101 may manage DSD 108 so that processor 102 can directly access address space 24 in SCM 116. For example, DSD 108 may provide logical to physical address translation information for SCM 116 to host 101, which can be called by host 101 and executed by control circuitry 110. In one example, metadata may be stored and remain in SCM 116 for access by processor 102. Other data such as user data may also be stored in SCM 116, but may be flushed to secondary memory 114 in response to a command from host 101 or a flag included in a command from host 101. As discussed below in more detail with reference to FIG. 3, a unique identifier (i.e., UID) for the flushed data may be used by DSD 108 with mapping table 22 to identify a physical address for storing the flushed data in secondary memory 114.

Data from secondary memory 114 may be cached in address space 24 using a page size for secondary memory 114 (e.g., 4 KB, 16 KB). In cases where PCIe is used for communication between host 101 and DSD 108 or in cases where SCM 116 is host-managed, processor 102 may access smaller portions of the cached data since SCM 116, unlike secondary memory 114, is byte-addressable. Processor 102 may directly access these portions of data in SCM 116 or directly perform operations on such data in address space 24, thereby reducing the amount of data being transferred between DSD 108 and host 101 as compared to conventional systems where a full page size of data would be loaded into a local main memory of host 101 (e.g., main memory 104) and flushed from host 101 to DSD 108.

In other implementations, such as when communication between host 101 and DSD 108 is through SATA or SAS, data from secondary memory 114 may be cached in address space 24 using a page size for reading data from secondary memory 114. In such implementations, processor 102 may access data in SCM 116 via a page cache in main memory 104. In some implementations, processor 102 may offload operations on data in address space 24 by requesting control circuitry 110 to perform the operations, thereby reducing the amount of data being transferred between DSD 108 and host 101 as compared to conventional systems where such data would be loaded into a local main memory of host 101 (e.g., main memory 104) for performing the operations and a result flushed from host 101 to DSD 108.

As will be appreciated by those or ordinary skill in the art, other implementations of DSD 108 and host 101 may include a different arrangement of data structures and/or components than those shown in FIG. 1. For example, in some implementations, the components of DSD 108 and host 101 may be housed in a single device, as opposed to having a separate host and DSD. In yet other implementations, some of the components of host 101 and DSD 108 may be housed together, such as where processor 102 and SCM 116 may be in a single device with secondary memory 114 attached.

Figure 2:
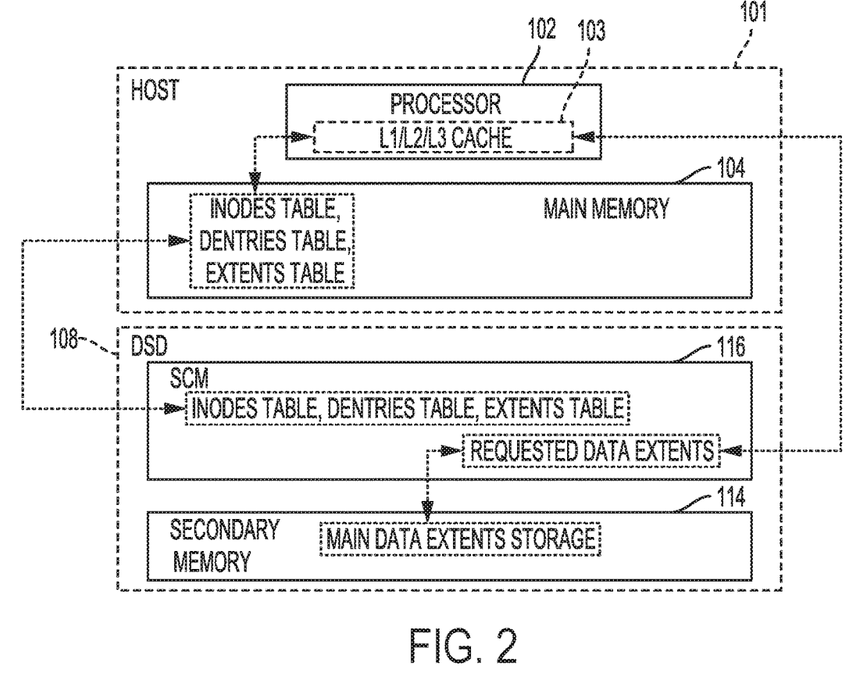
FIG. 2 illustrates an example of use of a Storage Class Memory (SCM) by a processor according to an embodiment.

FIG. 2 illustrates an example of use of SCM 116 by processor 102 according to an embodiment. As shown in FIG. 2, processor 102 can include one or more cache levels 103 where data is loaded from, evicted, or flushed to main memory 104 and SCM 116. Such data can include, for example, portions of code and related data being processed by processor 102. File system metadata may also be accessed by the one or more cache levels 103, such as portions of an inodes table (a table that stores information about files and directories, such as ownership, access mode, and file type), dentries table (a table that stores directory entries that relate inode numbers for files to their filenames and parent directories), and an extents table (a table that indicates ranges storing a file). In addition, data extents requested by processor 102 and loaded into address space 24 can be accessed directly by the one or more cache levels 103 by bypassing main memory 104 in implementations where PCIe is used for communication between host 101 and DSD 108 or where SCM 116 is host-managed. In cases where the versions of data or metadata stored in main memory 104 and SCM 116 are the same, the one or more cache levels 103 may access the data or metadata from main memory 104 or directly from SCM 116 by bypassing main memory 104.

In some cases, application 18 or another application may only request a portion of a data extent that is smaller than a smallest writable or readable unit of secondary memory 114, such as less than a block size or sector size. In response, processor 102 may execute instructions to copy the block or sector including the requested data into address space 24 of SCM 116. The whole block or sector may be loaded into SCM 116, and then only the requested portion of the block or sector may then be returned to host 101, rather than the entire block or sector loaded from secondary memory 114. This ordinarily reduces the amount of data that needs to be transferred between host 101 and DSD 108. In this regard, any copy operations between SCM 116 and main memory 104 or the one or more caches 103 may be made on a byte basis in implementations where host 101 has direct access to SCM 116 (e.g., with a PCIe interface between host 101 and DSD 108 or where SCM 116 is host-managed).

For example, if 64 bytes are requested, a whole sector of data may be read from secondary memory 114 and loaded into address space 24 of SCM 116 before returning the requested 64 bytes to host 101. In some cases, this may take longer than host 101 retrieving a 4 KB page size from secondary memory for the same request, but future requests for such data will be faster since such data can remain in address space 24 of SCM 116 without having to copy the data from secondary memory 114. Frequently accessed data, such as file system metadata, may only be stored in address space 24 of SCM 116 or may be prioritized for storage in address space 24 to significantly improve performance with repeated accesses of the cached data over time. In such implementations, mapping table 22 may indicate whether certain portions of data are already cached in address space 24 so that the data requested by processor 102 can be accessed without having to load it from secondary memory 114 if the data has already been cached in SCM 116.

The foregoing use of SCM 116 can improve the performance of the system including host 101 and DSD 108 since latency is reduced by caching frequently accessed data, such as file system metadata, in SCM 116, and in some implementations, by also not having to use a page cache at host 101 to load data from DSD 108 into main memory 104 or write data from main memory 104 to secondary memory 114. The size of main memory 104 can also be reduced with use of address space 24 of SCM 116, which reduces the power usage of the system since SCM 116 uses less power than main memory 104 in the case where main memory 104 is a DRAM.

Figure 3:
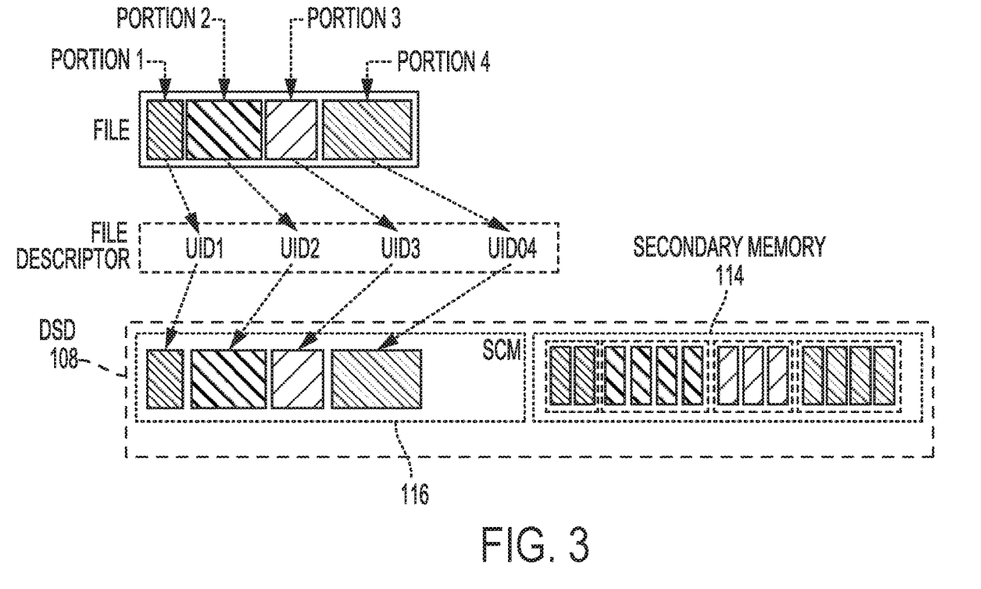
FIG. 3 illustrates an example of associating portions of data stored in a secondary memory of a DSD with unique identifiers according to an embodiment.

FIG. 3 illustrates an example of associating portions of data stored in secondary memory 114 of DSD 108 with unique identifiers according to an embodiment. As shown in FIG. 3, a file is divided into four portions indicated with different cross-hatching in the file. A unique identifier or "fingerprint" is calculated for each of the portions and stored in an extents tree, as shown with UID1 to UID4 in FIG. 3. In some implementations, the unique identifiers are calculated by applying a hash function to the data portions. The extents tree can include a UID and a length for the data portion represented by the UID. This extents tree differs from a conventional extents tree in that it includes a UID as opposed to a starting Logical Block Address (LBA) and a number of logical blocks or physical sectors for the extent. The extents tree can be represented by a radix tree or other tree data structure, such as a b-tree.

The unique identifiers can be stored in SCM 116 of DSD 108, while the data portions themselves are stored in secondary memory 114. In some implementations, all of the on-disk file system's metadata structures can be stored in SCM 116. The unique identifiers can be used to locate and access data portions in secondary memory 114. The sizes of the data portions can vary based on data access patterns of different applications executed by processor 102 of host 101, a file type for the data, and/or a size of the data.

Figure 4:
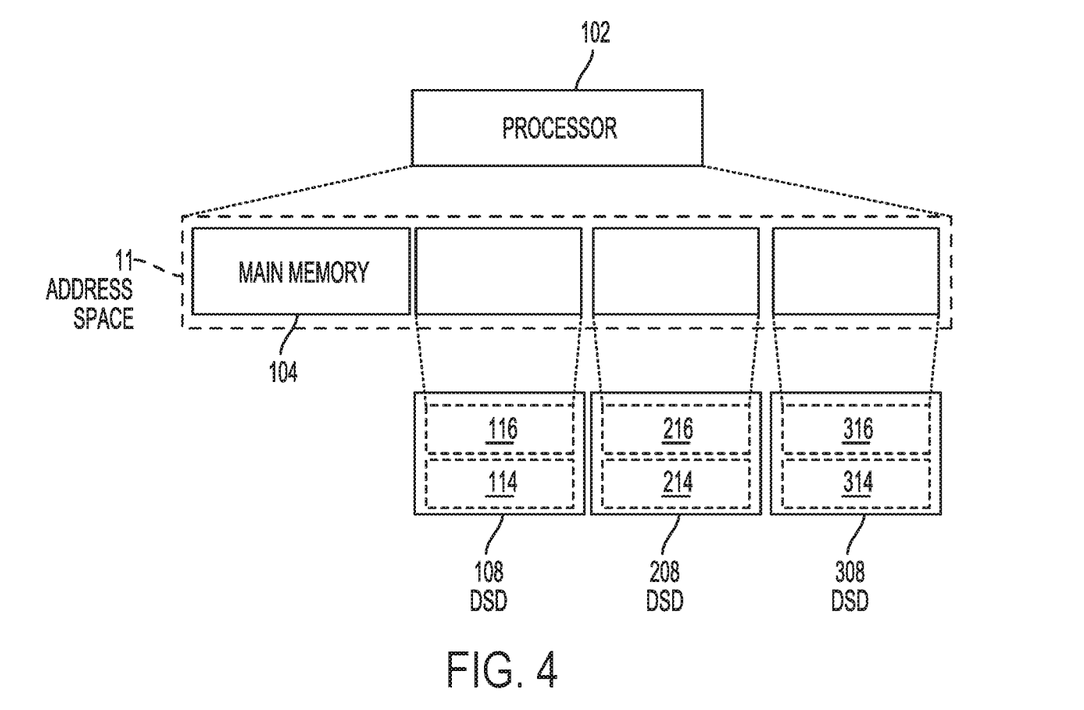
FIG. 4 illustrates an example of a plurality of DSDs each with an SCM configured as part of an aggregate address space according to an embodiment.

FIG. 4 illustrates an example of a plurality of DSDs each with their own SCM that includes a reserved address space configured as part of an aggregate address space for use by processor 102 according to an embodiment. As shown in FIG. 4, processor 102 uses address space 11, which maps to or includes at least a portion of main memory 104, SCM 116 of DSD 108, SCM 216 of DSD 208, and SCM 316 of DSD 308. In implementations where PCIe is used or where SCM 116 is host-managed, processor 102 may directly access the address spaces provided by the SCMs so as to extend the aggregate address space of processor 102. In other implementations, such as where SATA or SAS is used, the access of the address spaces provided by the SCMs may not be by a direct or native access of processor 102, such as where a page cache is used by processor 102 in main memory 104.

In addition to their respective SCMs, each of DSD 108, 208 and 308 include a secondary memory as secondary memories 114, 214 and 314. As with secondary memory 114 in the example of FIG. 1, secondary memories 214 and 314 are configured to store data in a smallest writable unit that is greater than a byte, such as in a 4 KB, 8 KB, or 16 KB page size, and have at least one of a greater read latency and a greater write latency than SCMs 216 and 316, respectively.

The example of FIG. 4 illustrates the scalability of the foregoing arrangements of SCM and secondary memory within a DSD when used by a host processor as a byte-addressable address space. Such scalability can further expand the size of the address space without having to add greater power-consuming main memory (e.g., DRAM) at host 101. The use of unique identifiers as discussed above with reference to FIG. 3 further illustrates how OS 12 of host 101 can load and flush data from aggregate address space 11 in some implementations without the use of a page cache in main memory 104, thereby improving throughput and performance of processor 102 in terms of how quickly data can be accessed.

In addition, and as discussed in more detail below with reference to the example of FIG. 5, the use of unique identifiers to access data by the SCM of a DSD can allow processor 102 to load smaller portions of data directly into caches 103 of processor 102, and potentially bypass storing such data in main memory 104. In such implementations, only the result of operations performed by processor 102 may then be stored directly in SCM 116 and bypass main memory 104. The amount of data traffic is then reduced between host 101 and DSD 108 or between processor 102 and SCM 116 due to the smaller amounts of data being transferred, and performance can be improved by not needing to use main memory 104.

Figure 5:
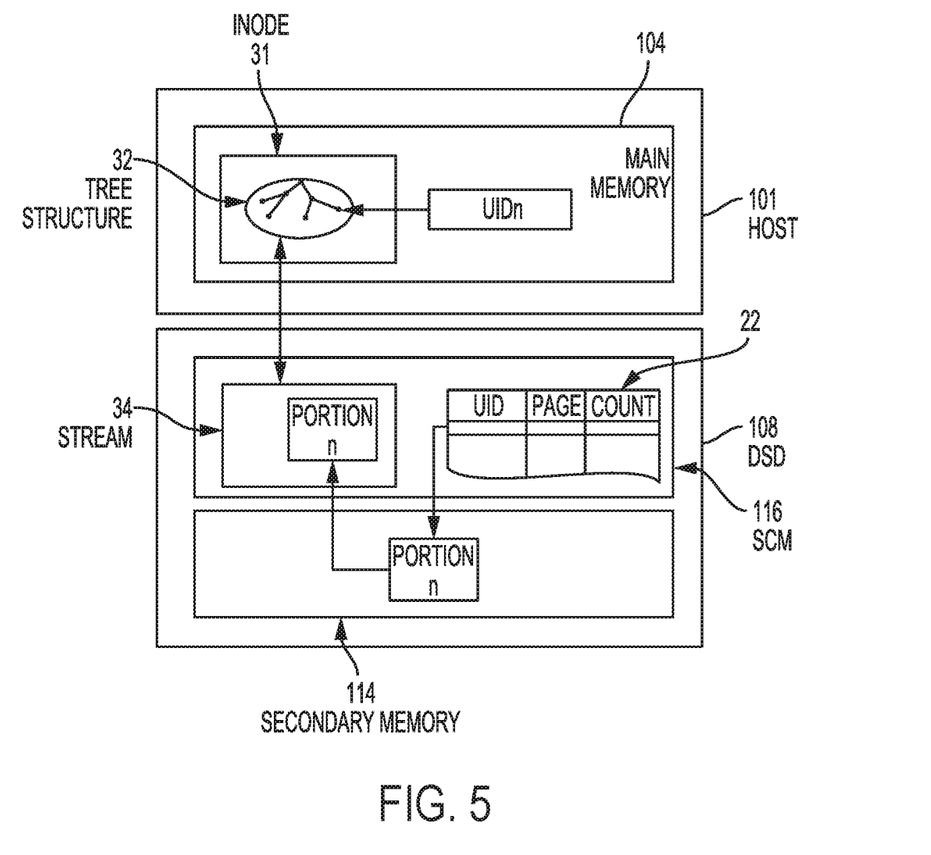
FIG. 5 provides an example of a data access operation according to an embodiment.

FIG. 5 provides an example of a data access operation according to an embodiment. As shown in FIG. 5, a file instance is represented in main memory 104 of host 101 by inode 31 including tree structure 32 (e.g., a radix tree). Tree structure 32 can include UIDs for portions of data instead of pointers to pages in the page cache that store data for the file instance. In other implementations, tree structure 32 may be stored in SCM 116 of DSD 108 if processor 102 has direct access to SCM 116, and the locations of tree structure 32 may point to an address space in SCM 116 and/or in main memory 104 used for storing the portions of the file instance.

The file instance in the example of FIG. 5 includes a data portion n that is represented by a unique identifier, UIDn, in tree structure 32. As noted above, tree structure 32 includes unique identifiers at different nodes for the different portions of data pointed to by tree structure 32, unlike tree structures in conventional inodes.

In the example of FIG. 5, a request for data portion n is sent to DSD 108 from host 101 and includes unique identifier, UIDn, which identifies the portion n for access from DSD 108. DSD 108 receives the request and uses mapping table 22 to identify a physical storage location in secondary memory 114 that stores portion n. In FIG. 5, an entry for UIDn is located in mapping table 22 and a corresponding page address and count of pages for the data portion are associated with UIDn for retrieving portion n from secondary memory 114. In other implementations, mapping table 22 may include a different arrangement, such as an extent or length of the data portion.

Portion n is then retrieved from secondary memory 114 and loaded into SCM 116. Control circuitry 110 may create reserved stream 34 in SCM 116 based on the request for data portion n from host 101 for sending the requested data to host 101. Processor 102 may then directly access the requested portion n in reserved stream 34 from SCM 116.

Example Processes

Figure 6:
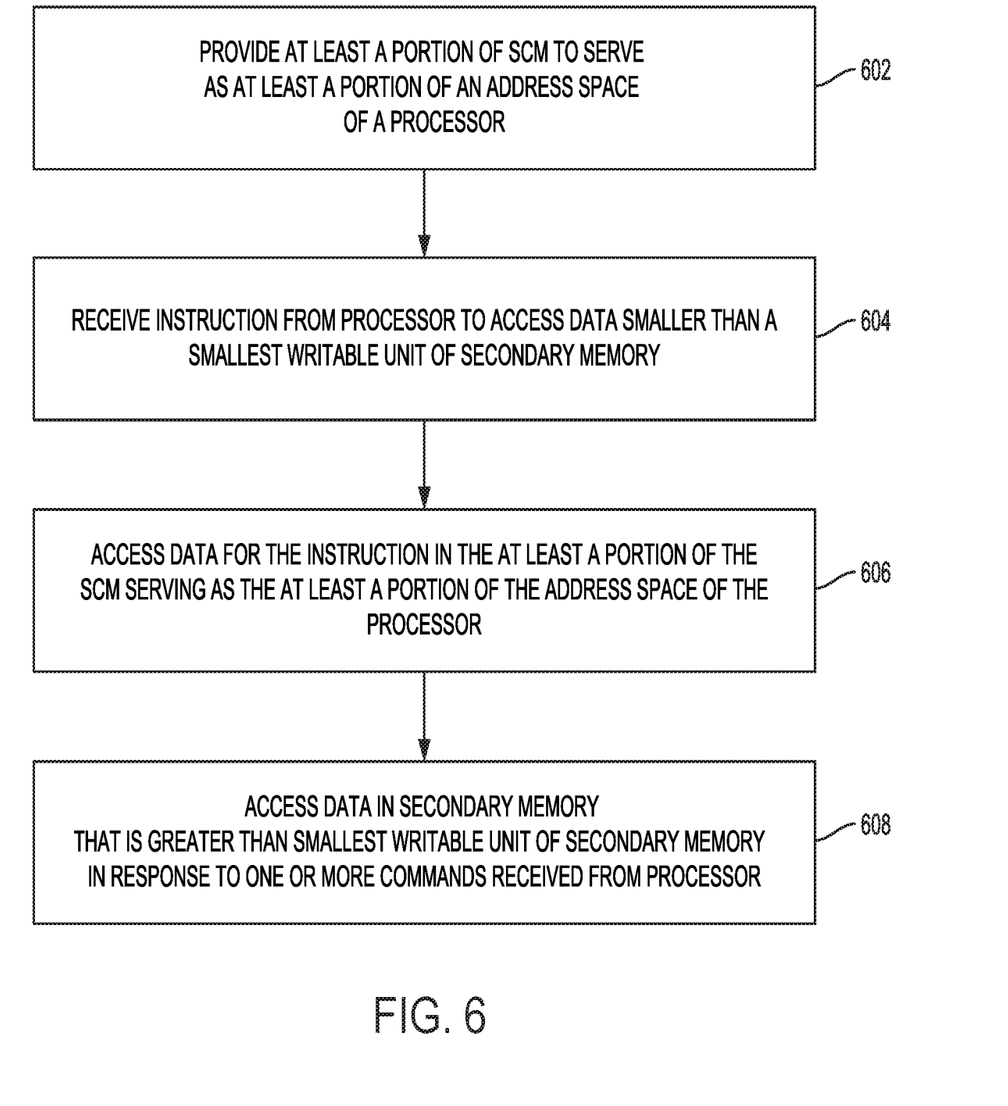
FIG. 6 is a flowchart for a data access process according to an embodiment.

FIG. 6 is a flowchart for a data access process according to an embodiment. The data access process of FIG. 6 can be performed, for example, by control circuitry 110 of DSD 108 executing DSD firmware 20.

In block 602, at least a portion of SCM 116 is provided by control circuitry 110 to serve as at least a portion of an address space of processor 102 of host 101. The provided address space of SCM 116 (i.e., address space 24 in FIG. 1) may extend the address space available to processor 102 in main memory 104 so that data or metadata used by processor 102 may be stored in SCM 116. In some implementations, address space 24 may be part of an aggregate address space formed by portions of main memory 104 at host 101 and/or other SCMs at other DSDs (e.g., SCMs 216 and 316 in FIG. 4).

In block 604, DSD 108 receives an instruction from processor 102 for data smaller than a smallest writable unit of secondary memory 114. For example, the instruction from processor 102 may include a request to load such data into address space 24, or a store request from processor 102 to evict data previously loaded into address space 24 to secondary memory 114. When evicting such data, the data may be treated as volatile data that is not stored or flushed to secondary memory 114 or the evicted data may be treated as persistent data so that changes to the data are stored or flushed to secondary memory 114. In other examples, and as discussed in more detail below with reference to FIG. 8, the instruction from processor 102 in block 604 can include an operation instruction to perform an operation on data stored in secondary memory 114 or SCM 116.

In block 606, data for the instruction is accessed (i.e., written or read) in the at least a portion of SCM 116 serving as at least a portion of the address space of processor 102 (e.g., address space 24) in response to the instruction received in block 604. In some cases, the data may be accessed in address space 24 in response to a read request from processor 102 to provide processor 102 with the requested data. In other cases, the data may be accessed to flush it to secondary memory 114 with or without keeping a copy of the flushed data in address space 24. In yet other cases, operations or transformations of the data may be performed by control circuitry 110 while the data is stored in SCM 116.

In block 608, control circuitry 110 also receives commands from processor 102 to read or write data in secondary memory 114 in data sizes greater than the smallest writable unit of secondary memory 114. Control circuitry 110 may optionally perform such commands without using SCM 116. In this regard, the use of SCM 116 ordinary allows DSD 108 to act similar to a main memory of host 101 with a byte-addressable address space (e.g., address space 24 in FIG. 1) and as a persistent storage with secondary memory 114.

Figure 7:
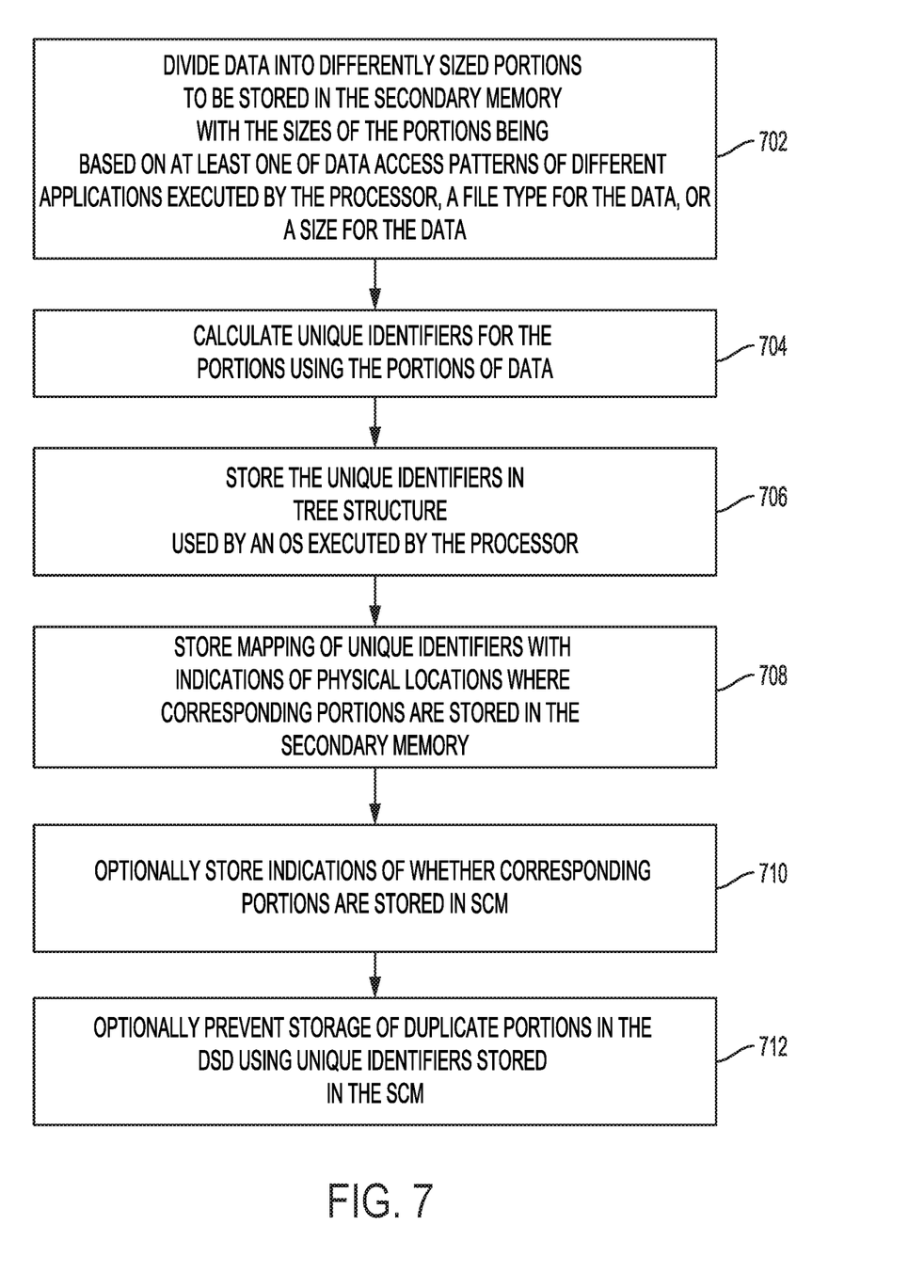
FIG. 7 is a flowchart for a unique identifier process according to an embodiment.

FIG. 7 is a flowchart for a unique identifier process according to an embodiment. Parts of the unique identifier process of FIG. 7 may be performed by processor 102 and other parts of the process may be performed by control circuitry 110. For example, in some implementations, one or more of blocks 702, 704, and 706 may be performed by processor 102 of host 101 executing DSD driver 16 or a file system, with the remaining blocks of FIG. 7 being performed by control circuitry 110 of DSD 108 executing DSD firmware 20. In other implementations, all of the blocks of FIG. 7 may be performed by control circuitry 110 of DSD 108.

In block 702, data is divided into differently sized portions to be stored in secondary memory 114. The sizes of the data portions can be based on, for example, at least one of data access patterns of different applications executed by processor 102, a file type for the data, and a total size of the data to be stored.

The division of data into differently sized portions can allow, for example, the access of data in units that vary from a fixed page or block size (e.g., 4 KB or 512 bytes) as typically used in current systems. This can provide for either a more granular data access that is less than a conventional block size, or result in less metadata in cases where the data portion is larger than a conventional block size, since more data can be referenced by the metadata. In this regard, different applications executed by processor 102 may access data in different sizes. For example, application 18 executed by processor 102 may generate relatively large amounts of data as compared to other applications executed by processor 102, so larger sized portions may be used for data generated by application 18 than for other applications, which would result in less metadata being generated from the larger portions of data generated by application 18 than if a smaller fixed block size were used.

In block 704, a unique identifier or fingerprint is calculated for each of the differently sized portions from block 702. As noted above, the unique identifier may be calculated by processor 102 or by control circuitry 110. In some implementations, a file system executed at host 101 may calculate the UID and store the UID with the file system's metadata. In other implementations, the metadata structure including the UID (e.g., tree structure 32 in FIG. 5) may be shared between host 101 and DSD 108 so that DSD 108 can calculate and store the unique identifier in the metadata structure accessed by the file system. The UID can be calculated, for example, by applying a hash function to the data portion. As noted in more detail below, the unique identifiers can then be used to access data at a more granular level than when using a page cache as in conventional systems or for preventing the duplication of data stored in DSD 108 in secondary memory 114 and/or SCM 116.

In block 706, the unique identifiers are stored in a tree structure that is used by OS 12 executed by processor 102. As discussed above with reference to FIG. 5, the tree structure can be, for example, part of an inode used by a file system (e.g., tree structure 32 in FIG. 5). The tree structure may be stored in main memory 104 as in the example of FIG. 5, or in SCM 116. The unique identifiers stored in block 706 may be associated with a stream ID or inode ID for the file that includes the data portion pointed to by the unique identifier so that the file system can access the data portions.

In block 708, a mapping is stored in SCM 116 (e.g., in mapping table 22 in FIG. 1) of unique identifiers with indications of physical locations or physical addresses (e.g., PBAs) where the corresponding data portions for the unique identifiers are stored in secondary memory 114. The mapping in block 708 may be stored when the portions of data corresponding to the unique identifiers are first stored or written in DSD 108. If the content of the data portion is later changed, the unique identifier for the data portion is recalculated and the mapping is updated to indicate the recalculated unique identifier. As shown in the example of FIG. 5 discussed above, the unique identifier (e.g., UID in FIG. 5) may be associated with a page and a count of pages for locating the data portion corresponding to the unique identifier. Other implementations may include a different indication of the physical storage location of the data portion in secondary memory 114.

In addition, mapping table 22 in some implementations may also include an indication of whether the data portion is stored or cached in SCM 116. In block 708, control circuitry 110 of DSD 108 may optionally store such an indication of whether the corresponding data portions are stored in SCM 116 in addition to being stored in secondary memory 114. In some cases, control circuitry 110 may keep some or all of the data portions to be stored in SCM 116 for future read access by processor 102 in accordance with a caching policy. The caching policy may be based on, for example, a priority and/or a frequency of access for the respective portions of data.

The storage of the data portions in secondary memory 114 may also be deferred in some cases to more efficiently schedule write operations, or to allow for the modification of the data by processor 102 as discussed below with reference to FIG. 8.

In block 712, control circuitry 110 optionally checks to see if the unique identifier for each data portion is already included in mapping table 22, which would indicate that a duplicate of the data portion is already stored in secondary memory 114 and/or SCM 116. If so, control circuitry 110 may prevent the storage of the data portion corresponding to the matching unique identifier. This can ordinarily prevent duplicates of data portions from being stored in DSD 108, which can conserve storage space and reduce wear on secondary memory 114 and SCM 116.

Figure 8:
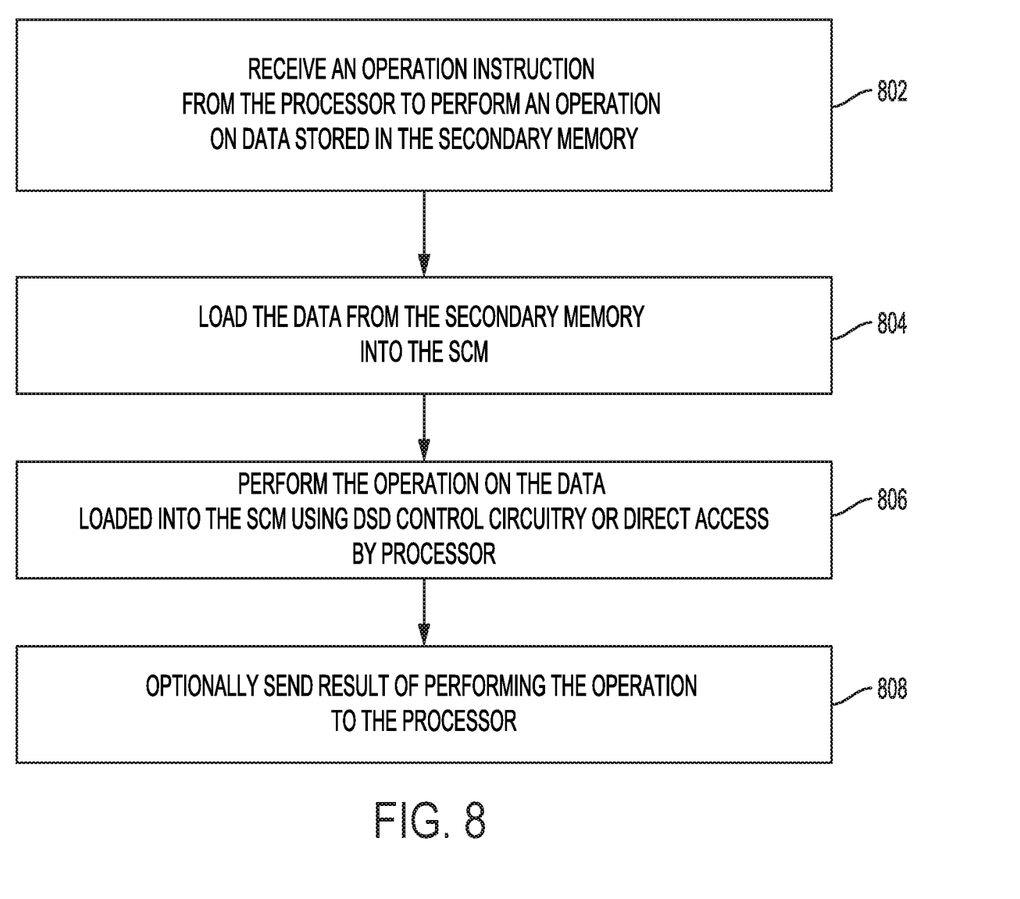
FIG. 8 is a flowchart for a data operation process within an SCM of a DSD according to an embodiment.

FIG. 8 is a flowchart for a data operation process within SCM 116 of DSD 108 according to an embodiment. The data operation process can be performed, for example, by control circuitry 110 executing DSD firmware 20 or by processor 102 executing DSD driver 16.

In block 802, DSD 108 receives an operation instruction from processor 102 to perform an operation on data stored in secondary memory 114. Examples of such operations can include, for example, to search for data meeting a particular search condition and apply a mathematical function or operation on data that meets the search condition.

In block 804, control circuitry 110 loads the data for the operation from secondary memory 114 into address space 24 of SCM 116. In block 806, the operation for the instruction is performed on the data loaded into SCM 116. In some implementations, control circuitry 110 of DSD 108 may perform the operation. In implementations where processor 102 of host 101 can directly access the data stored in SCM 116, such as with PCIe or where SCM 116 is host-managed, processor 102 may perform the operation on the data stored in SCM 116.

The result from performing the operation is optionally sent to processor 102 in block 808 for implementations where the operation is performed by control circuitry 110 of DSD 108. The result may include, for example, one or more numerical values or an indication of a logical result from performing the operation (e.g., true or false). By performing the operation through SCM 116 as opposed to through a main memory, such as main memory 104, it is ordinarily possible to reduce the size of main memory 104. In cases where main memory 104 is a DRAM, this can significantly reduce the power requirements of the system. In addition, by only sending the result of the operation from SCM 116 to processor 102 in cases where performance of the operation is offloaded to control circuitry 110, it is ordinarily possible to reduce the amount of data that would otherwise need to be transferred from DSD 108 to host 101 to perform the operation from main memory 104 of host 101. This reduction in data traffic can allow for more data to be transferred for other operations or data accesses at a given time.

As discussed above, the foregoing arrangements of a hybrid DSD including an SCM and the use of unique identifiers for accessing portions of data provides a more efficient access of data than conventional systems using a less granular or fixed page size. In addition, a byte-addressable SCM when combined with the disclosed unique identifiers can allow for direct access of the SCM by a host processor, which can replace the use of a page cache and the associated resources needed for the page cache.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or control circuitry, such as, for example, a Central Processing Unit (CPU), a Microprocessor Unit (MPU), a Microcontroller Unit (MCU), or a DSP, and can include, for example, an FPGA, an ASIC, or other programmable logic device, discrete gate or transistor logic, discrete hardware components, or any combination thereof designed to perform the functions described herein. A processor or control circuitry may also be implemented as a combination of computing devices, e.g., a combination of a DSP and an MPU, a plurality of MPUs, one or more MPUs in conjunction with a DSP core, or any other such configuration. In some implementations, the control circuity or processor may form at least part of an SoC.

The activities of a method or process described in connection with the examples disclosed herein may be embodied directly in hardware, in a software module executed by a processor or control circuitry, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or control circuitry can read information from, and write information to, the storage medium. In the alternative, the storage medium may be integral to the processor or the control circuitry.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A device, comprising:
   a Storage Class Memory (SCM) configured for byte-addressable access of data, wherein at least a portion of the SCM is further configured as at least a portion of an address space of a processor;
   a secondary memory configured to store data using a secondary memory smallest writable unit for writing data in the secondary memory, wherein the secondary memory smallest writable unit is larger than an SCM smallest writable unit for writing data in the SCM, and wherein the secondary memory has at least one of a greater read latency and a greater write latency than the SCM; and control circuitry configured to:
  receive an operation instruction from the processor to perform an operation on data stored in the secondary memory; and
  load the data from the secondary memory into the SCM for performance of the operation by the control circuitry of the device or by the processor.

2. The device of claim 1, wherein the operation includes at least one of searching for data meeting a search condition and applying a mathematical function on the data meeting the search condition.

3. The device of claim 1, wherein the control circuitry is further configured to send a result of performing the operation on the data loaded into the SCM to the processor.

4. The device of claim 1, wherein the control circuitry is further configured to associate portions of data stored in the secondary memory with unique identifiers calculated using the portions of data.

5. The device of claim 4, wherein the portions of data stored in the secondary memory have different data sizes based on at least one of data access patterns of different applications executed by the processor, a file type for the data, and a size of the data.

6. The device of claim 4, wherein the control circuitry is further configured to store the unique identifiers in a tree structure that is used by an operating system executed by the processor.

7. The device of claim 4, wherein the control circuitry is further configured to prevent storage of a duplicate portion of data in the device using a unique identifier stored in the SCM.

8. The device of claim 4, wherein the control circuitry is further configured to store a mapping of the unique identifiers with indications of physical locations where the corresponding portions of data are stored in the secondary memory.

9. The device of claim 4, wherein the control circuitry is further configured to store a mapping of the unique identifiers with indications of whether the corresponding portions of data are stored in the SCM.

10. The device of claim 1, wherein the control circuitry is further configured to access data in the SCM that is metadata related to data stored in the secondary memory.

11. A method for operating a device including a Storage Class Memory (SCM) and a secondary memory that has at least one of a greater read latency and a greater write latency than the SCM, the method comprising:
  providing at least a portion of the SCM to serve as at least a portion of an address space of a processor, wherein an SCM smallest writable unit for writing data in the SCM is smaller than a secondary memory smallest writable unit for writing data in the secondary memory;
  receiving an operation instruction from the processor to perform an operation on data stored in the secondary memory; and
  loading the data from the secondary memory into the SCM for performance of the operation by control circuitry of the device or by the processor.

12. The method of claim 11, wherein the operation includes at least one of searching for data meeting a search condition and applying a mathematical function on the data meeting the search condition.

13. The method of claim 11, further comprising calculating unique identifiers for portions of data to be stored in the secondary memory using the portions of data to be stored in the secondary memory.

14. The method of claim 13, further comprising dividing data into differently sized portions to be stored in the secondary memory, wherein the different sizes of the portions are based on at least one of data access patterns of different applications executed by the processor, a file type for the data, and a size for the data.

15. The method of claim 13, further comprising storing the unique identifiers in a tree structure that is used by an operating system executed by the processor.

16. The method of claim 13, further comprising preventing storage of a duplicate portion of data in the device using a unique identifier stored in the SCM.

17. The method of claim 13, further comprising storing a mapping of the unique identifiers with indications of physical locations where the corresponding portions of data are stored in the secondary memory.

18. The method of claim 13, further comprising storing a mapping of the unique identifiers with indications of whether the corresponding portions of data are stored in the SCM.

19. A system, comprising:
  a processor;
  a Storage Class Memory (SCM) configured for byte-addressable access of data, wherein at least a portion of the SCM is further configured to serve as at least a portion of an address space of the processor;
  a secondary memory configured to store data using a secondary memory smallest writable unit for writing data in the secondary memory, wherein the secondary memory smallest writable unit is larger than an SCM smallest writable unit for writing data in the SCM, and wherein the secondary memory has at least one of a greater read latency and a greater write latency than the SCM; and
  means for:
    receiving an instruction from the processor to access data smaller than the secondary memory smallest writable unit;
    in response to the instruction received from the processor to access data smaller than the secondary memory smallest writable unit, accessing the data for the instruction in the at least a portion of the SCM serving as the at least a portion of the address space of the processor;
    receiving one or more commands from the processor to access data that is greater than the secondary memory smallest writable unit; and
    in response to the one or more commands received from the processor to access data that is greater than the secondary memory smallest writable unit, accessing data in the secondary memory for the one or more commands received from the processor.

20. The system of claim 19, further comprising:
  at least one additional SCM configured for byte-addressable access of data, wherein at least a portion of the at least one additional SCM is further configured to serve as at least a portion of the address space of the processor; and
  at least one additional secondary memory configured to store data using the secondary memory smallest writable unit for writing data in the at least one additional secondary memory, wherein the at least one additional secondary memory has at least one of a greater read latency and a greater write latency than the at least one additional SCM.

* * * * *